United States Patent
Porte et al.

(10) Patent No.: US 6,375,121 B1
(45) Date of Patent: Apr. 23, 2002

(54) METHOD FOR MAKING A COMPOSITE PANEL AND RESULTING PANEL

(75) Inventors: Alain Porte, Colomiers; Robert Andre, Lacroix-Falgarde, both of (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/355,197

(22) PCT Filed: Nov. 25, 1998

(86) PCT No.: PCT/FR98/02521

§ 371 Date: Jul. 26, 1999

§ 102(e) Date: Jul. 26, 1999

(87) PCT Pub. No.: WO99/26841

PCT Pub. Date: Jun. 3, 1999

(30) Foreign Application Priority Data

Nov. 26, 1997 (FR) .............................. 97 15180

(51) Int. Cl.⁷ ................................. B64C 1/14
(52) U.S. Cl. .................................... 244/129.4
(58) Field of Search ........................... 244/123, 119, 244/129.4, 53 R, 55, 54; 60/226.1, 271, 39.31

(56) References Cited

U.S. PATENT DOCUMENTS

| | | | |
|---|---|---|---|
| 4,037,809 A | * | 7/1977 | Legrand ..................... 244/54 |
| 4,053,667 A | | 10/1977 | Smith |
| 4,055,041 A | * | 10/1977 | Adamson et al. ......... 60/226 R |
| 4,132,069 A | * | 1/1979 | Adamson et al. ......... 60/226 R |
| 4,471,609 A | | 9/1984 | Porter et al. |
| 4,557,440 A | | 12/1985 | Adams |
| 4,735,841 A | | 4/1988 | Sourdet |
| 4,746,389 A | | 5/1988 | DiGenova |
| 5,064,147 A | | 11/1991 | Noble et al. |
| 5,101,621 A | * | 4/1992 | Mutch ....................... 60/226.1 |
| 5,136,839 A | * | 8/1992 | Armstrong ................ 60/226.1 |
| 5,157,915 A | * | 10/1992 | Bart ......................... 60/39.31 |
| 5,251,435 A | * | 10/1993 | Pauley ...................... 60/226.1 |
| 5,315,820 A | * | 5/1994 | Arnold ...................... 60/226.1 |
| 5,603,471 A | * | 2/1997 | Armstrong ................ 244/53 R |

* cited by examiner

Primary Examiner—Peter M. Poon
Assistant Examiner—Kevin Jakel
(74) Attorney, Agent, or Firm—Young & Thompson

(57) ABSTRACT

The object of the invention is a process for the production of a monolithic composite panel provided to be articulated on a support, particularly a panel articulated by hinges (36) for the production of a fan hatch of a turbo reactor or of a landing gear door in an aircraft, the panel comprising openings for the emplacement of elements (24, 26, 28) of service such as access doors, ports and/or ventilating grilles, characterized in that it consists in providing a network of beams (54, 56) as a function of the openings, avoiding the emplacements of the service elements, shaped and positioned for taking up the transmission of forces particularly between the articulation device and the panel. The invention also covers the panel obtained and the hatch particularly for use in an aircraft.

17 Claims, 6 Drawing Sheets

METHOD FOR MAKING A COMPOSITE PANEL AND RESULTING PANEL

Figure 1:
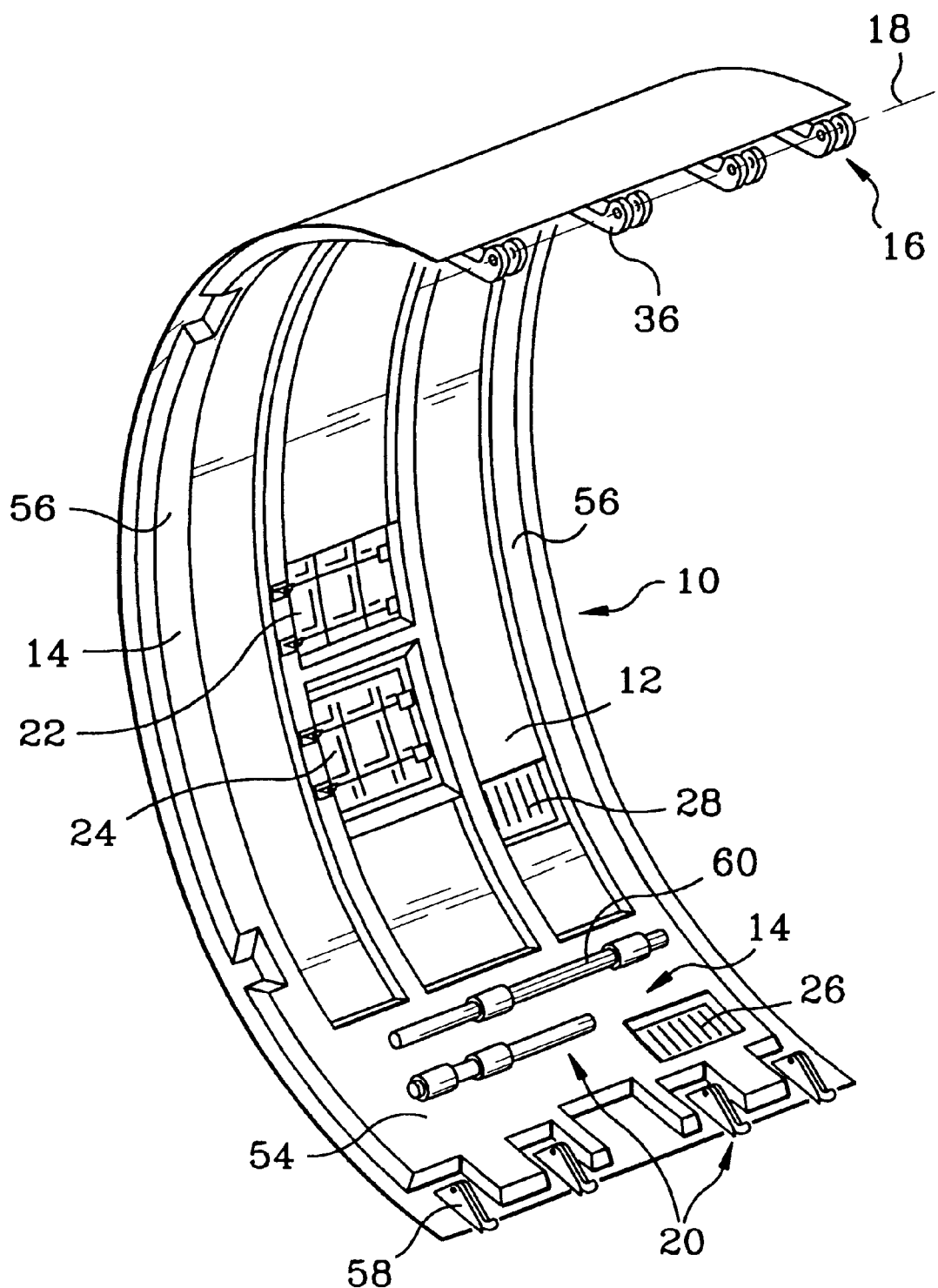

The present invention relates to a process for the production of an articulated monolithic composite panel and the obtained panel, which have mechanical characteristics suitable more particularly in the transmission of forces, particularly for application to the fan hatches of turbo reactors or landing gear doors.

Certain elements of an aircraft are subjected to particular mechanical stresses because they are movable and/or dismountable and are in contact with the outside, which requires high resistance to shocks.

Moreover, being mounted on aircraft, these elements must remain light and insensitive to the loss of technical or service fluids: water, oil, hydraulic fluid.

The panel constituting the element must resist fire and satisfy various standards which establish minimum resistance tests in case of deterioration or rupture of a part constituting said element.

The elements recited above such as hatches are at present made essentially by three processes:
composite sandwich structure,
metallic monolithic structure, and
composite or hybrid monolithic structure.

Throughout the description and the claims, there will be meant by "monolithic" a sheet, leaf or plate, of a single ply or composed by several assembled plies secured directly to each other, without interposition of a core of cellular material as in a sandwich panel.

The composite sandwich structure is interesting from the point of view of the weight because it comprises an aerodynamic external skin of small thickness, and an internal similarly thin skin, between which is interposed a core of a porous material such as honeycomb, these three constituents being secured together.

It will be noted that the skins are thin because the sandwich structure permits easily achieving the desired general mechanical resistances. This is also a drawback because the skins are intrinsically fragile and have low resistance to impact, particularly the external skin. Moreover, there must be added protections against fire and lightning to meet the technical and regulatory requirements.

As to the sandwich structure itself, it will be noted that in case of loss, the core of porous material or of foam soaks up fluids and can give rise to certain accumulation which it is sought precisely to avoid.

These sandwich structures are also relatively difficult to repair because the weight of a repair plate of polymeric or metallic material with riveting is delicate, which is not satisfactory in the case of aircraft, for users and for maintenance services.

The metallic monolithic structure has inherent defects as to material, particularly an unfavorable mass balance. Moreover, it is necessary to rivet the reinforcing frames directly on the metallic plates and risk of corrosion remains.

Moreover, when there are movable elements such as hatches or flaps, it is often difficult to position the frame used whilst ensuring good alignment of the metal hinges. Generally, the frames are fishtailed on the hinges to transmit the various forces to which the movable member is subjected.

The composite or hybrid monolithic structure comprises a single skin reinforced by a frame with composite or metallic stiffeners connected to said skin by rivets or cement.

In this case, it is difficult to position the hinges unless the skin is of a thickness greater than that which is necessary, to permit the absorption of sharp forces.

This is prejudicial to the weight and to the cost.

Another problem arises when it is necessary to provide emplacements to position the access ports, inspection doors or ventilating grilles or other members in these movable elements which are made of composite material.

It will be understood that the positioning of the access door, the inspection port and/or grille is determined by the position of the member to be inspected.

However, the positions of the hinges also require precise positioning, determined by the manufacturer, which leads to particular problems when the frame provided for absorbing forces from the hinges coincides with an access port, an inspection door or a ventilating grille. The invention provides a solution to this problem.

Thus, the present invention has for its object a process for the production of a monolithic composite panel provided to be articulated on a support, particularly a panel articulated by means of hinges for providing a fan hatch of a turbo reactor or a landing gear door in an aircraft, said panel comprising openings for emplacement of service elements such as access doors, ports and/or ventilating grilles, characterized in that it consists in providing a network of beams, as a function of said openings, avoiding the emplacements of the surface elements, shaped and positioned for taking up and transmitting forces particularly between the articulation means and the panel. Such means are more particularly axial and circumferential beams.

Certain axial beams can be curvilinear and/or of variable cross-section along their longitudinal axis.

The process comprises more particularly the following steps:
draping over a mold of the shape of a panel to be obtained, of at least one ply of composite material to form a plate of a shape complementary to that of the mold,
emplacing on one of the surfaces of the panel, according to the predetermined network, cores of a cellular or foam material, avoiding the reserved openings,
draping on these cores at least one ply of a composite material covering partially the plate to form resistant beams, and
baking to polymerize, in one or two steps.

It is possible to add a ply of material which is highly conductive, between the mold and the first ply.

The invention also has for its object the articulated monolithic composite panel obtained by the practice of the process as well as the hatch particularly for equipping an aircraft such as a fan hatch of a turbo reactor or such as a landing gear door made from this panel by practice of the process.

There is known from U.S. Pat. No. 4,471,609 a hatch of composite material of the "core cowl" type, which is to say for protecting the core of a motor, which is different from a "fan cowl" which is a hatch for protecting the fans. The technical requirements involved are different as a function of the location. In this U.S. patent, the hatch is used to limit the bending deformation of the motor of the portion located in the very hot region, whilst absorbing large forces. The hatch described in this patent has no door or access port because the equipment to which access must be had is located outside these very hot regions.

The problems arising and the solutions applied are different from those of the present invention which is now described with respect to the accompanying drawings, which show a fan hatch of a turbo reactor to give an application of suitable particular use which is not however limiting.

Figure 7:
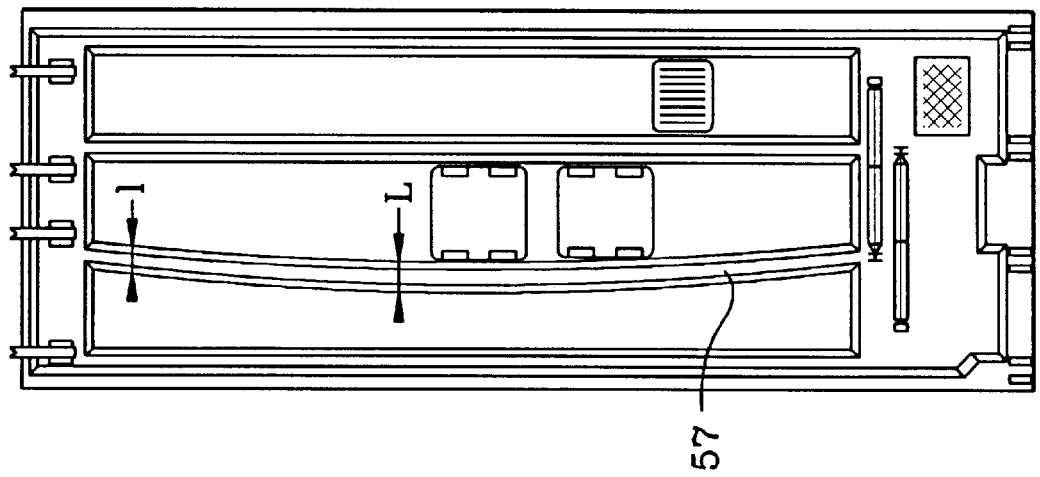
Figure 2:
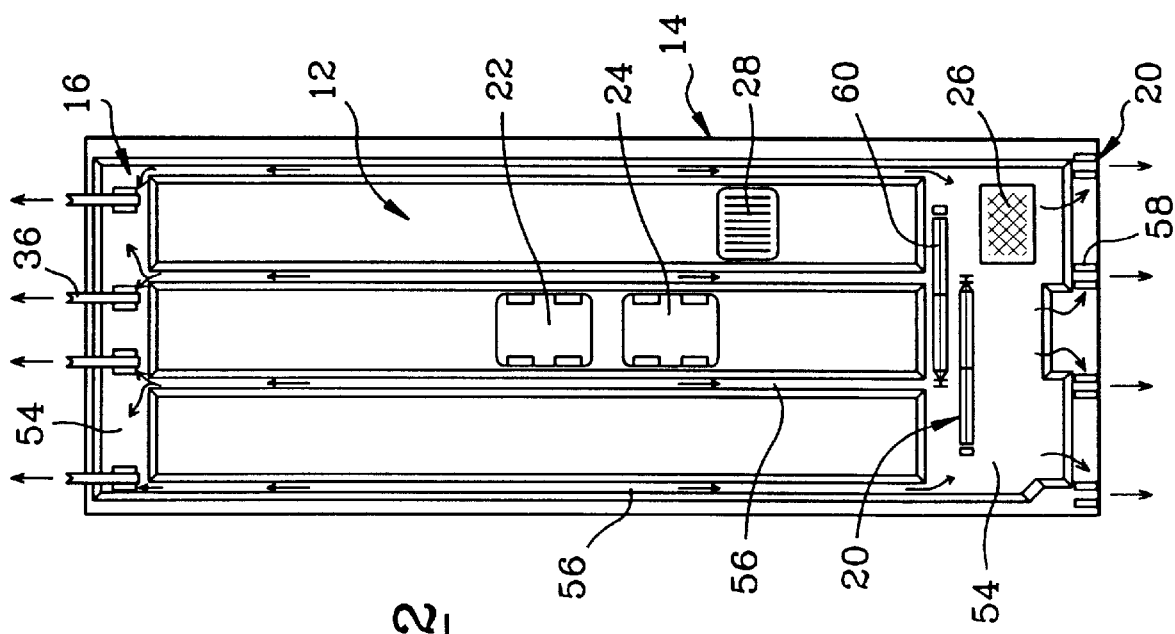
Figure 3:
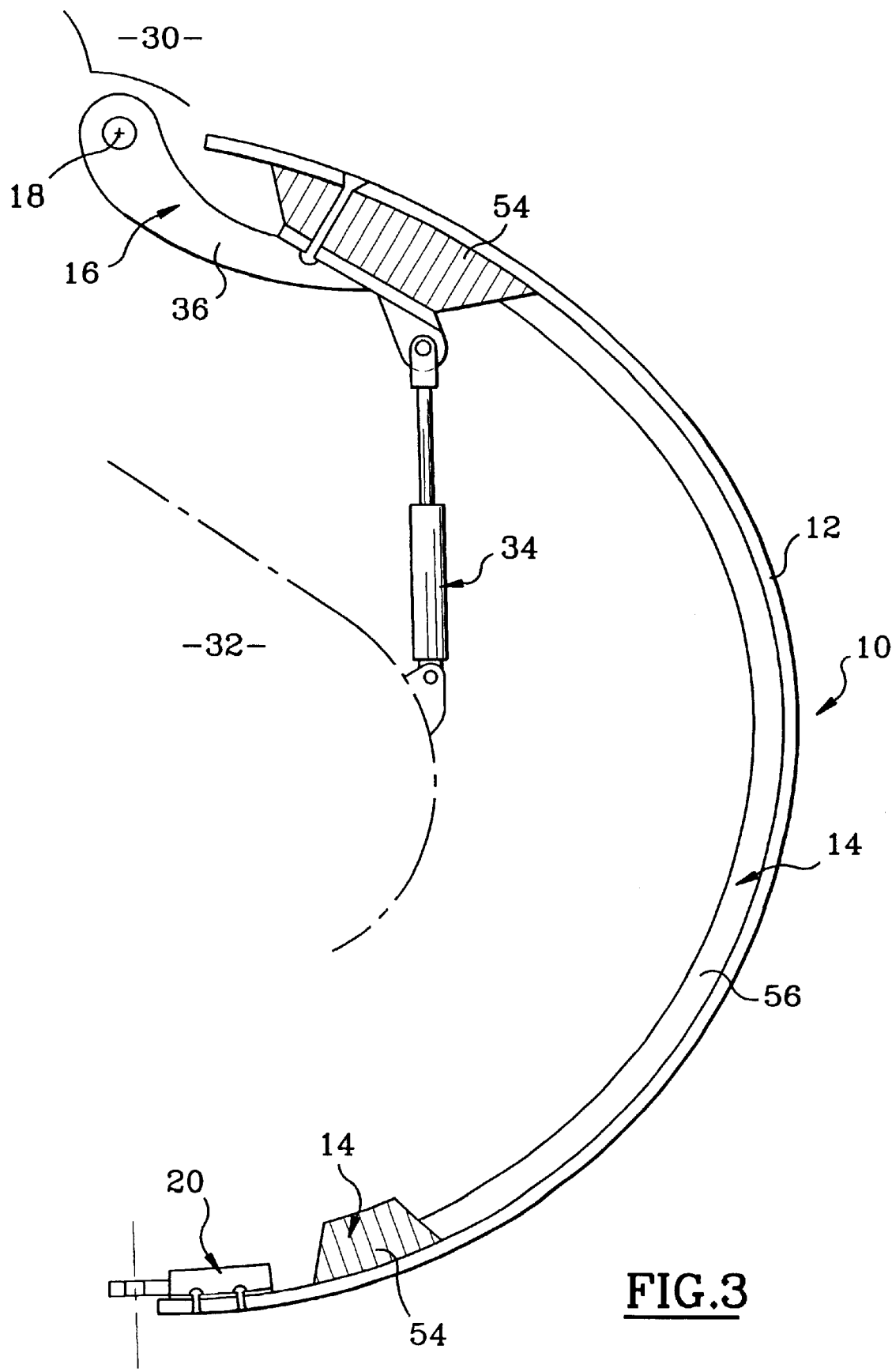
Figure 4:
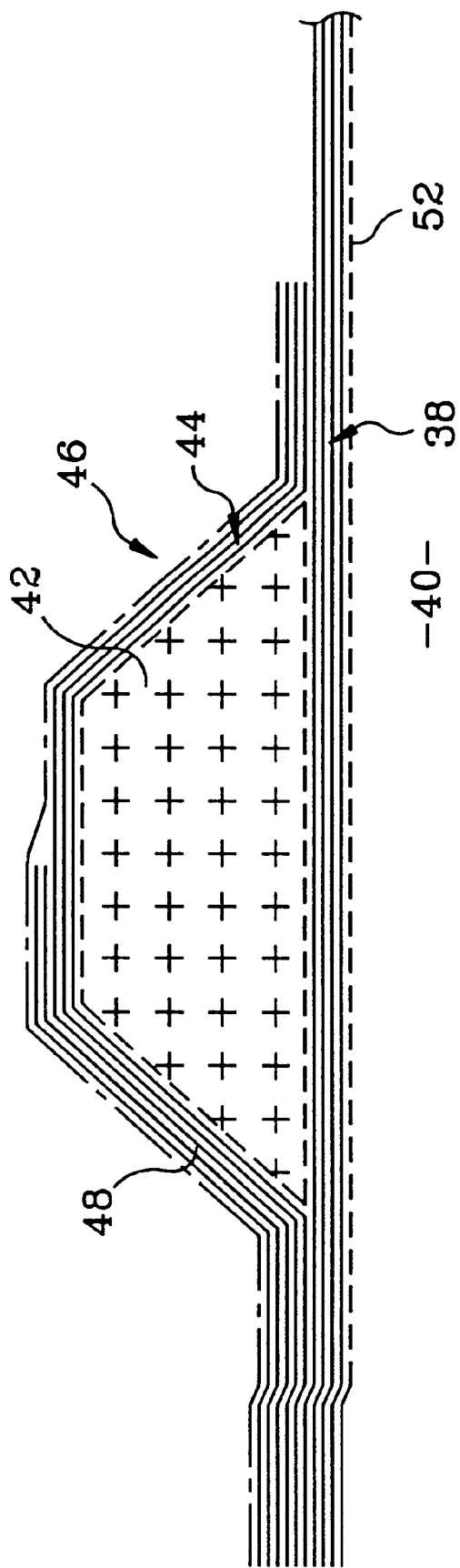
Figure 5:
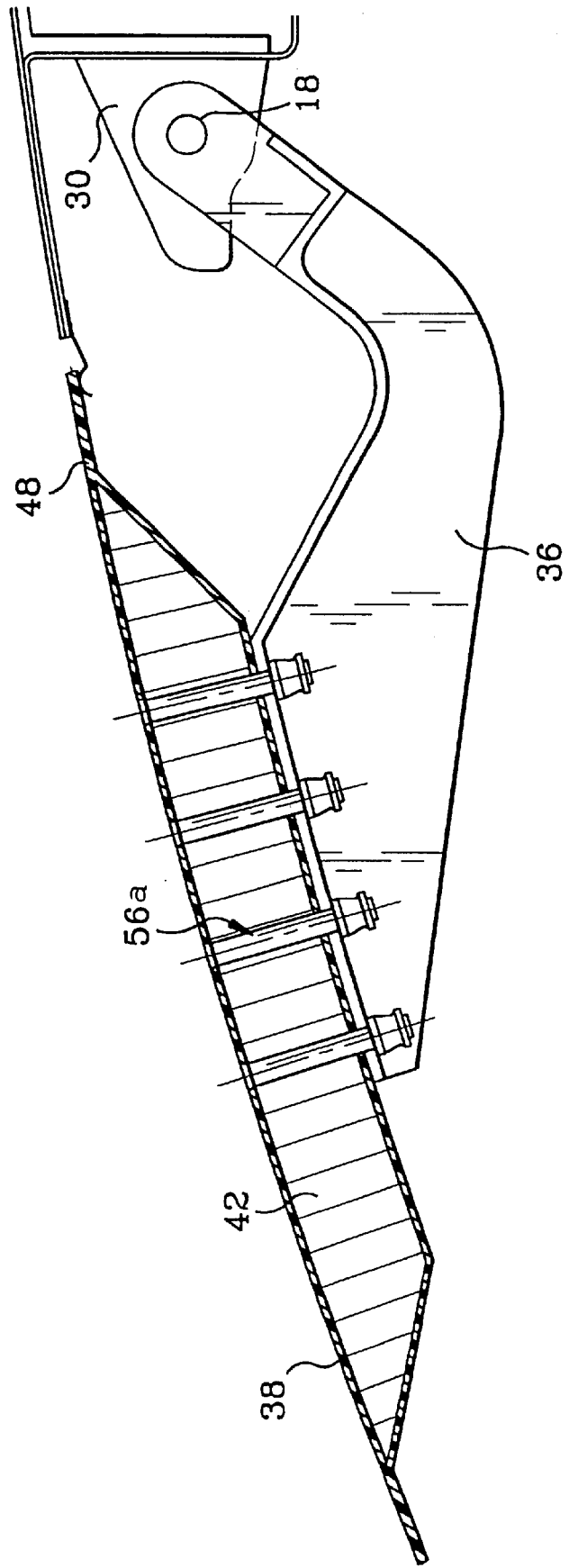
Figure 6:
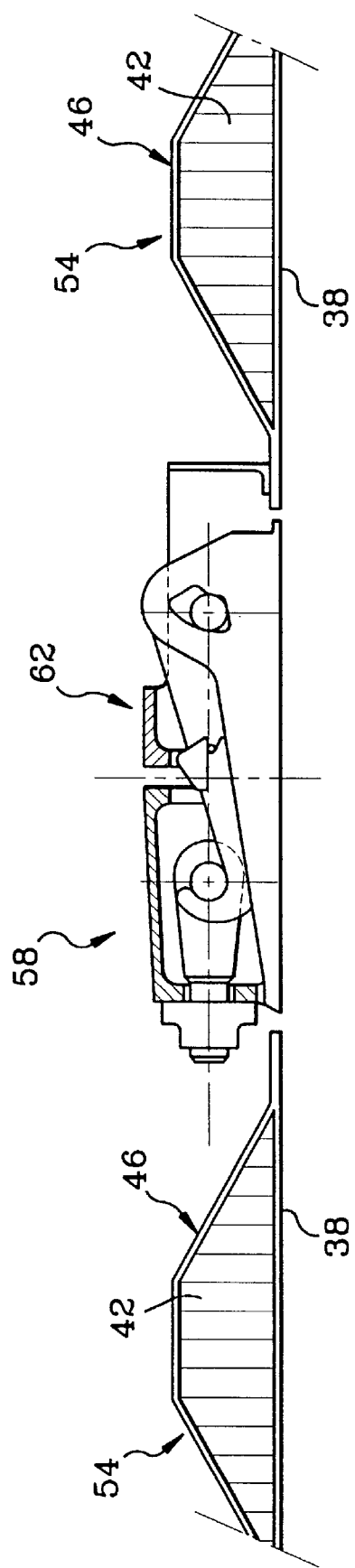

The various figures show:

FIG. 1, a perspective view of a fan hatch of a turbo reactor produced by the practice of the process according to the invention, FIG. 2, a front view of the inside of the hatch of FIG. 1, showing the arrangements for absorbing forces, FIG. 3, a longitudinal cross-sectional view of the hatch of FIGS. 1 and 2, mounted on the motor frame, FIG. 4, a cross-sectional detailed view of the panel obtained by the practice of the process, FIG. 5, a cross-sectional view of a detail of the mounting of a hinge on the panel, FIG. 6, a detailed view of the mounting of the frog locks permitting connecting to right and left fan hatches of the same turbo reactor, and FIG. 7, a detailed view of a hatch similar to that of FIG. 2 but with curvilinear circumferential beams.

In FIG. 1, there is shown a hatch 10 which comprises a panel 12 with integral stiffening means 14, forming a casing.

This hatch comprises mounting means 16 articulated about an axle 18 and locking means 20.

In the illustrated example, two access doors 22 and 24 are necessary in very exact positions on the panel as well as ventilating grille 26 and a port 28.

In FIGS. 2 and 3, the reference numerals are identical to those of FIG. 1 to show the same parts.

It will be particularly noted in FIGS. 1 and 3 that the panel is, in this instance, in the shape of that of the overall hatch of a turbo reactor of which the fan hatch 10 forms a portion.

In FIG. 3, there is also schematically shown the support structure which is to say the mast 30 as well as the motor 32 itself.

There will also be noted in FIG. 3, the means 34 for opening the hatch, in this instance a jack, which ensures the movements of rotation of the hatch about the axle 18 thanks to the hinges 36 constituting the means 16 for articulated mounting. This jack is provided on the axial edge beam, the same beam which supports the hinges.

The process according to the invention consists in integrating the stiffening means 14 to the panel 12. It is useful to refer to FIG. 4 for the details of the process of production.

There is produced a plate 38 with several plies, four in number for example.

A first step consists in producing the four first plies by draping over all the surface of a mold 40, of a shape conjugated at that of the external surface to be produced of a monolithic plate.

In the case in which the panel and its stiffeners are produced in two steps, a baking of the panel is necessary at this stage.

A second step consists in positioning the two molding cores 42 of light material, of the honeycomb type, to form the reliefs, surrounding the regions corresponding to the doors or other ports or grilles. The cores are thus disposed in the free regions, so as to provide beams which ensure resistance to forces.

A third step consists in draping these cores 42 with resistive plies 44 to form the beams 46 of Ω profile, the wings of this Ω profile being intimately connected to the monolithic plate 38.

The reinforcing plies 48 are if desired provided for the beams located bordering the panel as will further be seen.

A baking is then necessary to give to the different polymers of the composite materials their final mechanical characteristics. This baking is carried out in one or two steps, as needed and according to the material employed.

In the case of panels of composite material, the external surface if desired comprises a supplemental ply 52 comprised of a conductive sheet, for example a copper mesh, to improve the conductive properties. This ply is in reality the first when it is necessary, because it is disposed directly against the mold. This conductive sheet is optional because the thickness of the skin, in the present embodiment, can be sufficient to exceed it.

It will be noted, in the case of the hatch that is used to describe the invention, that the stiffening means 14 comprise a network of axial beams 54 which follow substantially the generatrices of the curved profile of the panel and of the circumferential beams 56 which follow directly the curve profile of the panel. These beams preferably have a caisson structure to give good performance as to resistance to torsion in particular.

The characteristic of the axial beams is to provide a path for the forces toward the hinges, principally forces from the circumferential beams that are not aligned with said hinges.

In certain cases, it can be advantageous and/or necessary to arrange several upper, lower or even intermediate axial beams as a function of the dimensions of the panel, the required openings, the necessary resistance and above all the points of anchoring of these different elements.

Thus in FIG. 5, it will be seen that each hinge 36 is directly connected to the upper axial beam 54, by bolting 56a. This permits absorbing large forces and the diffusion of abrupt forces and the bending of the assembly of the panel and of the circumferential beams, intermediate axial beams and lower axial beams as is shown in FIG. 2 by the various arrows.

For mounting the hinges directly on the beams, it is necessary only to take the precaution to provide during fabrication a core of high density material, resistant to compression so as to support the compressive forces during gripping.

In the case of the emplacement of the locks 58 and 60 of the locking means 20, it will be noted that the locations are different for each type of lock.

Thus, the locks 60 are provided on the lower axial beam 54. It will be noted that the forces exerted on the connecting rods of these locks are transmitted over all the panel through the network of axial and circumferential beams.

In the case of the locks 58, reference is had to FIG. 6 in which it can be seen that the frog locks 62 are provided for the fixed portion directly on the panel 12.

Thus, it will be seen that, in the case of a monolithic panel, the thickness is sufficient for that.

On the other hand, direct fixation on the axial or radial beams is carried out when the forces are great, as in the case of hinges for connecting the panel with the above mast or in the case of landing gear doors.

It will be noted that the members used as access ports, doors and/or grilles are located where need dictates. It will be noted that the network of axial and circumferential beams permits avoiding these special emplacements whilst permitting absorption of the forces and the effect of these forces on all the structure.

The advantage of such a production process are numerous.

First, the thickness of the monolithic panel gives to the finished hatch a high resistance to impact.

Then, in the case in which a hinge breaks, the hatch using a panel with integral stiffening means has an excellent behavior because the forces are distributed over all the beams and through the plate. These beams, with a high moment of inertia, have large capacities of mechanical resistance, which act in flexure, torsion or shear.

This is all the more interesting because, in the given example of a fan hatch, the greatest forces are exerted in flight and it is then that a hinge can break, but in view of the number of connection points and the network of axial and circumferential beams forming the integrated stiffeners, the behavior is particularly satisfactory. Breaking a hinge can thus be compensated.

If a loss of fluid takes place, it will be noted that the volumes adapted to absorb liquids are very reduced because they are limited only to the beams, which solves the problems of the embodiments of the prior art.

The mass balance is very interesting and even permits using plates having a large number of plies. Thus, the volumes of the beams are reduced; and the weight is very low, thanks to the cores of light material. This permits increasing substantially the resistance to impacts.

The problems of corrosion are avoided because no member of the panel is metallic.

The problems of fire resistance are solved by the thickness of the plate constituting the panel, which is sufficient to satisfy the standards.

The problem of repairing with bolted pieces is overcome because the pieces can be fixed easily and directly to the panel.

According to a modification of the invention, it will be noted that in certain cases, especially to provide an intermediate beam, the circumferential beams can be spaced from each other, which is to say that they can be curvilinear beams 57 in the already curved plane of the panel, see FIG. 7. This also permits avoiding certain obstacles in certain simple cases.

As a modification of the curvilinear beams 57, the beams can also be each of variable cross-section along their longitudinal axis, which is to say, thicker on opposite sides adjacent the point of curvature. This permits accommodating the greatest stresses at these points.

In the different instances given above, the height. of the axial beams is preferably but not necessarily greater than that of the circumferential beams, so as to facilitate draping. The final dimensions are given by computation.

The invention above all has the advantage of dissociating the positioning of the hinges and of the accessory members which are nevertheless necessary, such as doors, ports and other grilles.

In the case of aircraft, the location of the hinges is required by the manufacturer and another advantage which results from the process of the panel according to the invention with the network of beams, is the possibility of taking account of these emplacements whilst also permitting the positioning of the doors, ports and grilles where suitable in the panel, without the positioning of the hinges and the absorption of the corresponding forces limiting the choices. This possibility renders the design more flexible and permits in certain cases overcoming problems of location which it previously were unsolved.

It will be noted, thanks to the axial beams, that this poses no problem and that the circumferential beams do not have to be aligned with the hinges. Moreover, even in the case of breaking of the hinges, the forces are absorbed and distributed thanks to the axial beam which supports them.

This is indeed the essence of the present invention.

What is claimed is:

1. Process for the production of a monolithic composite panel adapted to be articulated on a support, particularly a shaped panel articulated by means of hinges for the production of a fan hatch of a turbo reactor or a landing gear door of an aircraft, said panel comprising openings for emplacement of service elements, comprising providing a network of beams, as a function of said openings, avoiding positions of the service elements, shaped and positioned for absorbing and transmitting forces particularly between the hinge means and the panel, said network comprising axial beams and curvilinear circumferential beams.

2. Process for the production of an articulated monolithic composite panel according to claim 1, wherein the transverse cross-section of at least one beam varies on its longitudinal axis.

3. An articulated monolithic composite panel, obtained by the practice of the process according to claim 1, provided to be articulated on a support by articulation means such as hinges for the production particularly of a fan hatch of ac turbo reactor or of a landing gear door in an aircraft, said panel comprising openings for the emplacement of service elements (26, 28), wherein said panel comprises a network of beams (54, 56) shaped and positioned for absorbing and transmitting forces particularly between the articulation means (16, 36) and the panel, by avoiding positions of the service elements.

4. Articulated monolithic composite panel according to claim 3, which comprises:

a shaped plate (38) produced with at least one ply of a composite material, a network of composite beams integrated into the panel, comprising axial beams (54) and circumferential beams (56) arranged so as to avoid positions of the service elements.

5. Articulated monolithic composite panel according to claim 3, wherein the network of beams comprises at least one beam (57) disposed along a curved line.

6. Articulated monolithic composite panel according to claim 3, wherein the transverse cross-section of the beams (54, 56, 57) is variable along the longitudinal axis.

7. Articulated monolithic composite panel according to claim 3, wherein the beams comprise cores (42) of a cellular or foam material whose density is selected as a function of the compressive force to be taken up upon mounting associated pieces.

8. Articulated monolithic composite panel according to claim 3, wherein the beams (54, 56, 57) have an Ω cross-section.

9. A hatch, particularly for an aircraft, such as a fan hatch of a turbo reactor or such as a landing gear door, made from a process according to claim 1, wherein said hatch comprises a panel (12) comprising integrated stiffening means (14), supplement equipment in this panel, these stiffening means (14) being arranged to avoid this supplemental equipment.

10. Hatch according to claim 9, which further comprises mounting means (16), said mounting means and certain of said locking means being provided on said beams.

11. Hatch according to claim 9, wherein the stiffening means (14) comprise at least axial (54) and circumferential (56) beams.

12. Hatch according to claim 11, which further comprises opening means (34) in the form of a jack, said opening means being fixed on a same axial post which supports hinges (36).

13. Hatch according to claim 11, wherein the axial beams receive mounting means (16) and/or locking means (20) comprising cores of high density cellular material.

14. Process for the production of an articulated monolithic composite panel having openings, which comprises the following steps:

draping on a mold having the shape of a panel to be obtained, at least one ply of composite material to form a plate with a shape conjugated to that of the mold, emplacing on one of the surfaces of the panel, according to the predetermined network, cores of porous foam material, avoiding said openings, draping these cores with at least one ply of composite material partially covering the plate to form resistant beams, and baking to polymerize.

15. Process for the production of an articulated monolithic composite panel according to claim 14, wherein the cores of cellular material are of high density for beams adapted to receive hinges.

16. Process for the production of an articulated monolithic composite panel according to claim 14, wherein the baking takes place in two steps, one after production of the shaped plate and the other after the emplacement of the beams on said plate.

17. Process for the production of an articulated monolithic composite panel according to claim 14, wherein one of the steps consists in placing a ply of highly conductive material between the mold and the first ply.

* * * * *